(12) United States Patent
Ichimura et al.

(10) Patent No.: US 7,082,756 B2
(45) Date of Patent: Aug. 1, 2006

(54) DEVICE FOR DETECTING FAILURE OF HYDRAULIC MOTOR, AND HYDRAULIC VEHICLE

(75) Inventors: Kazuhiro Ichimura, Niihari-gun (JP); Katsuaki Kodaka, Tsuchiura (JP); Saburou Yoshio, deceased, late of Niihari-gun (JP); by Akiko Yoshio, legal representative, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 38 days.

(21) Appl. No.: 10/450,945

(22) PCT Filed: Dec. 20, 2000

(86) PCT No.: PCT/JP00/09018

§ 371 (c)(1),
(2), (4) Date: Nov. 17, 2003

(87) PCT Pub. No.: WO02/50454

PCT Pub. Date: Jun. 27, 2002

(65) Prior Publication Data

US 2004/0168435 A1    Sep. 2, 2004

(51) Int. Cl.
*F16H 61/40* (2006.01)

(52) U.S. Cl. .............. 60/403; 60/406; 60/455

(58) Field of Classification Search ........... 60/399, 60/403, 406, 455; 92/5 R, 86
See application file for complete search history.

(56) References Cited

U.S. PATENT DOCUMENTS

| 3,661,060 A | * | 5/1972 | Bowen | 92/5 R |
| 5,564,519 A |   | 10/1996 | Katoh et al. | 180/243 |
| 5,845,494 A | * | 12/1998 | Nishizawa et al. | 60/403 |
| 2004/0060206 A1 | * | 4/2004 | Ichimura | 37/348 |

FOREIGN PATENT DOCUMENTS

| JP | A 50-16231 | 2/1975 |
| JP | U 50-31378 | 4/1975 |
| JP | U 58-116853 | 8/1983 |
| JP | A 4-238740 | 8/1992 |
| JP | U 5-96623 | 12/1993 |
| JP | U 6-37608 | 5/1994 |
| JP | A 9-250510 | 9/1997 |
| JP | A 2000-96604 | 4/2000 |
| JP | A 2000-170908 | 6/2000 |
| JP | A 2000-234535 | 8/2000 |

* cited by examiner

*Primary Examiner*—Thomas E. Lazo
(74) *Attorney, Agent, or Firm*—Oliff & Berridge, PLC

(57) ABSTRACT

A failure detection device for a hydraulic motor of the present invention comprises a hydraulic pump 3 that is driven by a prime mover 2; a hydraulic motor 1 that is driven by hydraulic oil discharged from the hydraulic pump 3; an abnormality detection device 35 that detects an abnormal operation of the hydraulic motor 1; and a warning device 30, 39, 40 that issues a warning when the abnormal operation of the hydraulic motor 1 is detected by the abnormality detection device 35.

8 Claims, 13 Drawing Sheets

US 7,082,756 B2

1

DEVICE FOR DETECTING FAILURE OF HYDRAULIC MOTOR, AND HYDRAULIC VEHICLE

TECHNICAL FIELD

This invention relates to a device that detects a failure of the hydraulic motor installed in the hydraulic drive vehicle such as a wheeled hydraulic excavator.

BACKGROUND ART

Generally, the hydraulic drive vehicle such as a wheeled hydraulic excavator comprises a hydraulic pump and a hydraulic motor for travelling which is driven by oil discharged from the hydraulic pump. The output shaft of this hydraulic motor is connected with the input shaft of the transmission, and the rotation of the hydraulic motor is transmitted to the wheels through the transmission. A drain chamber is provided to the hydraulic motor, and the drain oil from the hydraulic motor returns to a reservoir via the drain chamber.

In such a hydraulic drive vehicle as described above, if a foreign body should be ingested by the hydraulic motor, proper operation of the hydraulic motor is impeded and there is a danger that the hydraulic motor may be damaged. If the hydraulic motor is damaged, the discharged oil from the hydraulic pump flows into the drain chamber and in some cases it may flow into the transmission. As a result, the transmission therein is filled with the oil, and a great resistance comes to act on the transmission so that the travelling performance of the vehicle deteriorates. Moreover, when transmission oil becomes mixed with the oil from the hydraulic motor, the quality of the mission oil may be deteriorated, and this may exert a negative influence upon the operation of the transmission.

DISCLOSURE OF THE INVENTION

An object of the present invention is to provide a failure detection device for a hydraulic motor that is capable of detecting an abnormality of the hydraulic motor and responding appropriately to the abnormal operational situation.

Moreover, another object of the present invention is to provide a hydraulic drive vehicle which is equipped with such a failure detection device for a hydraulic motor.

In order to achieve the object described above, a failure detection device for a hydraulic motor according to the present invention comprises a hydraulic pump that is driven by a prime mover; a hydraulic motor that is driven by hydraulic oil discharged from the hydraulic pump; an abnormality detection device that detects an abnormal operation of the hydraulic motor; and a warning device that issues a warning when the abnormal operation of the hydraulic motor is detected by the abnormality detection device.

Furthermore, a hydraulic drive vehicle according to the present invention comprises a hydraulic pump that is driven by a prime mover; a hydraulicmotor for traveling that is driven by hydraulic oil discharged from the hydraulic pump; an abnormality detection device that detects an abnormal operation of the hydraulic motor for traveling; and a warning device that issues a warning when the abnormal operation of the hydraulic motor for traveling is detected by the abnormality detection device.

2

Therefore, it is possible for an operator to recognize any abnormal operation of the hydraulic motor at an early stage and to take measures appropriate to such abnormal operation.

A driving of the hydraulic motor may be restricted instead of issuing the warning.

The hydraulic motor may be a hydraulic motor for traveling and it is desirable to lower a rotational speed of the prime mover when the abnormal operation of the hydraulic motor for traveling is detected. It is also acceptable to stop traveling and moreover to apply a brake after the traveling has stopped. It is preferable to prevent a restarting of the prime mover when the abnormal operation of the hydraulic motor for traveling is detected. In addition, the warning may be issued.

The abnormal operation of the hydraulic motor can be detected according to increase of a drain pressure of the hydraulic motor or deterioration of a seal member that prevents a drain oil of the hydraulic motor from flowing out.

The operation of the warning device and the drive restriction upon the vehicle may be disabled when the working state has been detected.

It is preferable to reset the above-described control according to a reset command. The reset command may be issued in response to actuation of an ignition key switch.

BEST MODE FOR CARRYING OUT THE INVENTION

First Embodiment

A wheeled hydraulic excavator that is equipped with a failure detection device according to the first embodiment of the present invention will now be described with reference to FIGS. 1 through 4. The wheeled hydraulic excavator comprises a wheeled undercarriage upon which an upper-structure is rotatably mounted, and a working attachment is fitted to this upper-structure. A hydraulic motor 1 for traveling which is driven by a hydraulic circuit for traveling shown in the FIG. 1 is provided in the undercarriage.

Figure 1:
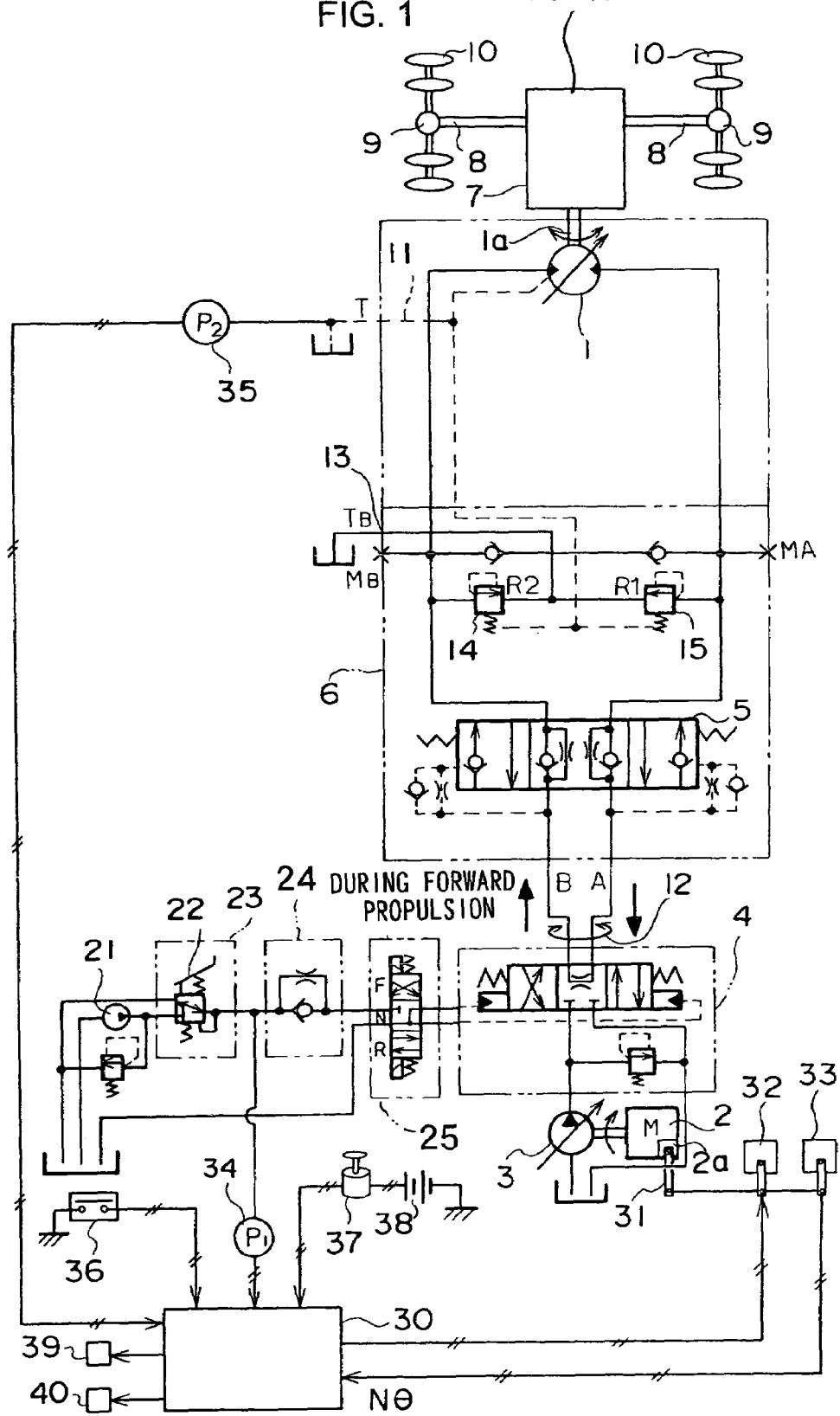
FIG. 1 is a circuit diagram showing the structure of the wheeled hydraulic excavator equipped with the failure detection device for a hydraulic motor according to the first embodiment of the present invention.

As shown in FIG. 1, hydraulic oil is discharged from a main pump 3 which is driven by an engine, the direction and flow rate of the discharged oil are controlled by a control valve 4, and then the hydraulic oil is supplied to a traveling motor 1 via a brake valve 6 with a built-in counterbalance valve 5. A transmission 7 is connected with an output shaft 1a of the traveling motor 1. The rotational speed of the traveling motor 1 is changed by the transmission 7, and the rotational output is transmitted to tires 10 through propeller shafts 8 and axles 9. Thus, the wheeled hydraulic excavator is propelled. It should be noted that the pressure oil from the main pump 3 is also supplied to a hydraulic circuit for working which is not shown in the figure, and drives actuators for working.

The direction of changeover and operation amount of the control valve 4 are controlled by pilot pressure from a pilot control circuit. The traveling speed of the vehicle can be controlled by controlling the amount by which the control valve 4 is operated. The pilot control circuit comprises a pilot pump 21, a traveling pilot valve 23 that generates a secondary pilot pressure P1 according to the amount by which an accelerator pedal 22 is stepped upon, a slow-return valve 24 that delays oil returning to the pilot valve 23, and a forward/reverse switchover valve 25 which is used for selecting forward traveling, reverse traveling or neutral for the vehicle. The forward/reverse switchover valve 25 is constituted of a solenoid-controlled directional control valve, and its position is changed over by operating a switch not shown in the figures.

FIG. 1 shows the situation with the forward/reverse switchover valve 25 in its neutral (N) position, and moreover when the traveling pilot valve 23 is not being operated. Accordingly, the control valve 4 is in its neutral position, the pressure oil from the main pump 3 returns to a reservoir, and the vehicle remains stopped. When the forward/reverse switchover valve 25 is switched to its forward traveling position (F position) or to its reverse traveling position (R position) by the operation of the switch, and then the accelerator pedal 22 is stepped upon, the secondary pressure according to the amount by which the accelerator pedal is operated acts on a pilot port of the control valve 4. The control valve 4 is operated by the operation amount corresponding to the secondary pilot pressure P1. Thus, the discharged oil from the main pump 3 is led to the traveling motor 1 via the control valve 4, a center joint 12 and the brake valve 6, so as to drive the traveling motor 1. At this time, the leakage oil from the traveling motor 1 is collected to the reservoir through a drain line (drain chamber) 11.

When the accelerator pedal 22 is released during vehicle traveling, the pressure oil from the pilot pump 21 is interrupted by the traveling pilot valve 23, and an outlet port of the traveling valve is connected to the reservoir. As a result, the pressure oil having acted on the pilot port of control valve 4 returns to the reservoir via the forward/backward switchover valve 25, the slow-return valve 24 and the traveling pilot valve 23. At this time, the returning oil flow is restricted by the restriction of the slow-return valve 24, so that the control valve 4 returns to its neutral position gradually. When the control valve 4 returns to its neutral position, the supply of the pressure oil (drive pressure) is interrupted, and the counterbalance valve 5 is then switched to its neutral position as shown in FIG. 1.

At this time, the vehicle continues to progress due to its inertia force, and the operation of the traveling motor 1 changes over from motor action to pump action, in which its B port is its suction (inlet) port and its A port is its discharge (outlet) port in FIG. 1. Flow of the pressure oil from the traveling motor 1 is restricted by the restriction of the counterbalance valve (neutral restriction), the pressure between the counterbalance valve 5 and the traveling motor 1 then rises and acts on the traveling motor 1 as brake pressure. As a result, the traveling motor 1 generates the brake torque to slow the vehicle down. If, during the pump operation of the hydraulic motor, the quantity of oil flowing into the traveling motor 1 becomes insufficient, the additional oil is supplied from a make-up port 13 thereto. The maximum brake pressure is regulated by relief valves 14 and 15.

A governor 2a of the engine 2 is connected with a pulse motor 32 via a link mechanism 31, and the rotational speed of engine 2 is controlled by rotation of the pulse motor 32. In particular, the engine speed is increased by the normal rotation of the pulse motor 32, while it is decreased by the reverse rotation of the pulse motor. A potentiometer 33 is connected with the governor 2a via the link mechanism 31, and the potentiometer 33 detects a governor lever angle corresponding to the rotational speed of the engine 2. The detected value is input to the controller 30 as a control rotational speed $N\theta$.

Furthermore, the controller 30 is connected with a pressure sensor 34 that detects the secondary pilot pressure P1 generated by the traveling pilot valve 23, corresponding to the pedal operation amount, a pressure sensor 35 that detects the pressure (drain pressure P2) of the leakage oil from the traveling motor 1, a reset switch 36, and an ignition key switch 37 that is turned on/off according to the operation of an ignition key, respectively. A power source 38 is connected with the key switch 37, and the electrical power is supplied to the controller 30 in response to the key switch 37 being turned on. Accordingly, the controller 30 implements calculations as will be described later, to control the rotation of the pulse motor 32 by outputting the control signal to the pulse motor 32 and also to control operations of a buzzer 39 and a warning lamp 40 by outputting control signals thereto.

Figure 2:
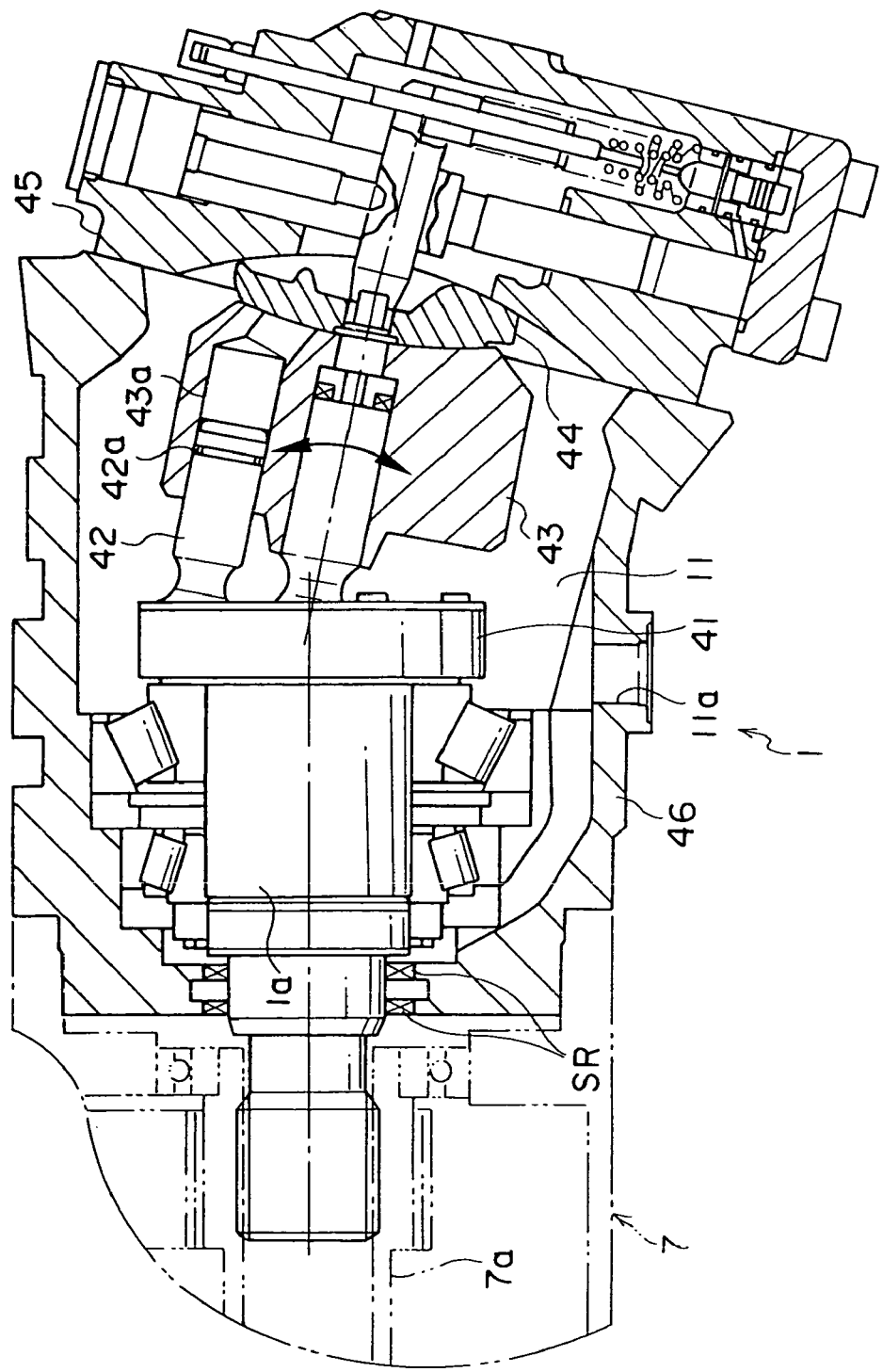
FIG. 2 is sectional view of a traveling motor to which the present invention has been applied.

Next, the construction of the traveling motor 1 will be explained. FIG. 2 is a sectional view of the variable displacement traveling motor 1. As shown in FIG. 2, a plurality of pistons 42 (only one of which is shown in the figure) are connected with a flange 41 of the output shaft 1a of the traveling motor 1, along its circumference. The pistons 42 are slidably inserted into oil chambers 43a formed in a cylinder block 43 through piston rings 42a. The end of the cylinder block 43 comes into contact with a swash plate 44, and their contacting surfaces mutually define a circular cone shape. The swash plate 44 can be swung or inclined together with the cylinder block 43 in the direction of the arrow shown in the figure, and the motor displacement varies according to the swing amount or inclined angle of the swash plate.

An inlet or suction port and an outlet or delivery port of oil, not shown in the figure, are provided in the swash plate and a motor cover 45 which is in contact with the swash plate 44, the suction port and the delivery port extending over half a phase of the motor rotation, respectively. And, the pressure oil from main pump 3 flows into the oil chambers 43a through the suction port, while the oil from the oil chambers 43a flows out to the reservoir through the delivery port. Due to this, the pistons 42 are slid within the oil chambers 43a, and, while the swash plate 44 is kept incontact with the cylinder block 43, the output shaft 1a of the motor 1 rotates as a unit with the cylinder block 43 and the pistons 42. An input shaft 7a of the transmission 7 is connected by splines with the motor output shaft 1a so that the rotation of the traveling motor 1 is transmitted to the transmission 7.

At this time, portions of the pressure oil which is supplied to the oil chambers 43a from the main pump 3 leaks into the drain chamber 11 through gaps between the mutually contacting surfaces of the swash plate 44 and the cylinder block 43, or gaps between the mutually sliding surfaces of the pistons 42 and the oil chambers 43a. The leakage oil is returned to the reservoir through a drain hole 11a which is formed at the bottom of motor casing 46.

If, at this time, a foreign body, for example, should get into the mutually sliding surfaces of one of the pistons 42 and causes the piston 42 to stick in (to contact directly with) the cylinder block 43, the cylinder block 43 rotates while being dragged by the piston 42 and then, the gap between the cylinder block 43 and the swash plate 44 becomes partially increased. Moreover, according to circumstances, the piston ring 42a may be damaged, which causes the gap between the mutually sliding surfaces to become wider. As a result, a large quantity of the pressure oil from the main pump 3 flows into the drain chamber 11 through these gaps, and the oil pressure in the drain chamber 11 may increase. And, the oil from the drain chamber 11 may flow into the transmission 7 through and past seal rings SR.

In this embodiment, this type of abnormal operation of the traveling motor 1 is detected with the pressure sensor 35, and the following countermeasure takes place for such abnormal state.

Figure 3:
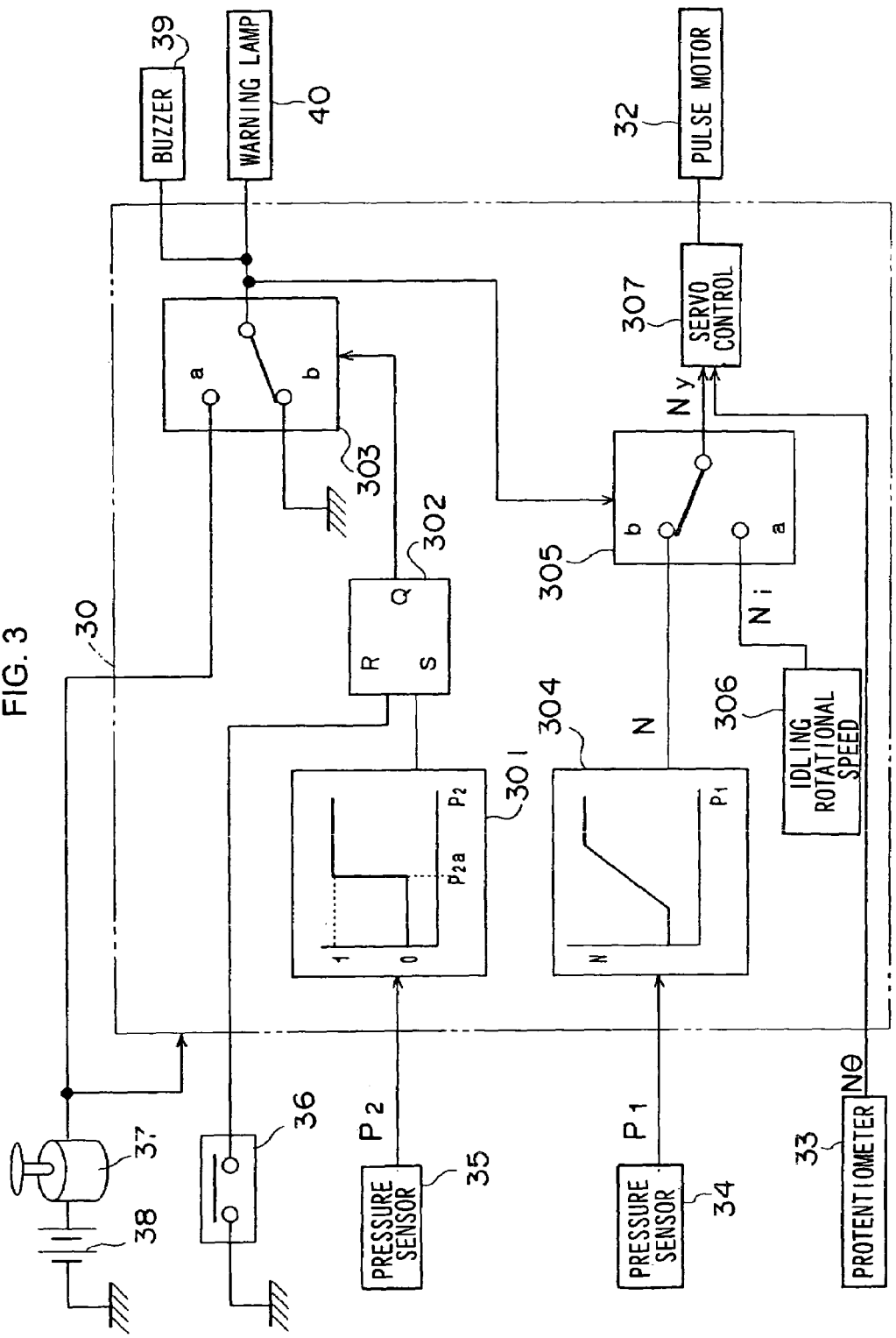
FIG. 3 schematically illustrates the details of a controller which constitutes the failure detection device according to the first embodiment of the present invention.

FIG. 3 is a schematic illustration to explain details of the controller 30. When the ignition key switch 37 is turned on, the electric power is supplied to the controller 30 to start execution of its processing. A function generator 301 outputs a set signal to a set terminal S of RS flip-flop 302 when the motor drain pressure which have been detected by the pressure sensor 35 is greater than or equal to the predetermined value P2a which is set in advance. Here, the predetermined value P2a is set to represent the oil pressure in the drain chamber 11 in the case of failure of the traveling motor 1 as described above. When the detected pressure value P2 reaches the predetermined value P2a or over, it may be determined that the traveling motor 1 has broken down. When the set signal is input to the set terminal S of the flip-flop 302, the flip-flop 302 outputs a high-level signal from its terminal Q to change over a switchover circuit 303 to its contact "a" side. As a result, electrical power is supplied to a buzzer 39 and a warning lamp 40, so that the buzzer emits sound and the buzzer lamp 40 is illuminated.

When a reset switch 36 is turned on, the reset switch 36 outputs a reset signal to a reset terminal R of the flip-flop 302. The flip-flop 302 sets low-level in the terminal Q in response to this reset signal, and the switchover circuit 303 is then switched to its contact "b" side. As a result, the supply of electrical power to the buzzer 39 and the warning lamp 40 is interrupted so that the buzzer sound is brought to a halt and the warning lamp 40 is extinguished.

A function by which the engine speed should increase along with increase of the traveling pilot pressure is set in advance in the function generator 304, as schematically shown in the figure. The function generator 304 sets the rotational speed N corresponding to the detected value P1 from the pressure sensor 34 based upon this function, and outputs this set value N to a switchover circuit 305. The switchover circuit 305 is changed over according to change of the switchover circuit 303. That is, when the switchover circuit 303 is switched to its contact "a" side, the switchover circuit 305 is also switched to its contact "a" side, and when the switchover circuit 303 is switched to its contact "b" side, the switchover circuit 305 is also switched to its contact "b" side. Accordingly, the switchover circuit 305 selects either the rotational speed N as set by the function generator 304 or an idling rotational speed Ni which is set in advance in a rotational speed setting device 306, and outputs its selected rotational speed to a servo control section 307 as a target rotational speed Ny. In the servo control section 307, the target rotational speed Ny is compared with the control rotational speed Nθ which corresponds to the amount of displacement of the governor lever as detected by the potentiometer 33, and the pulse motor 32 is controlled so as to bring the control rotational speed Nθ to match the target rotational speed Ny, according to the procedure shown in FIG. 4.

Figure 4:
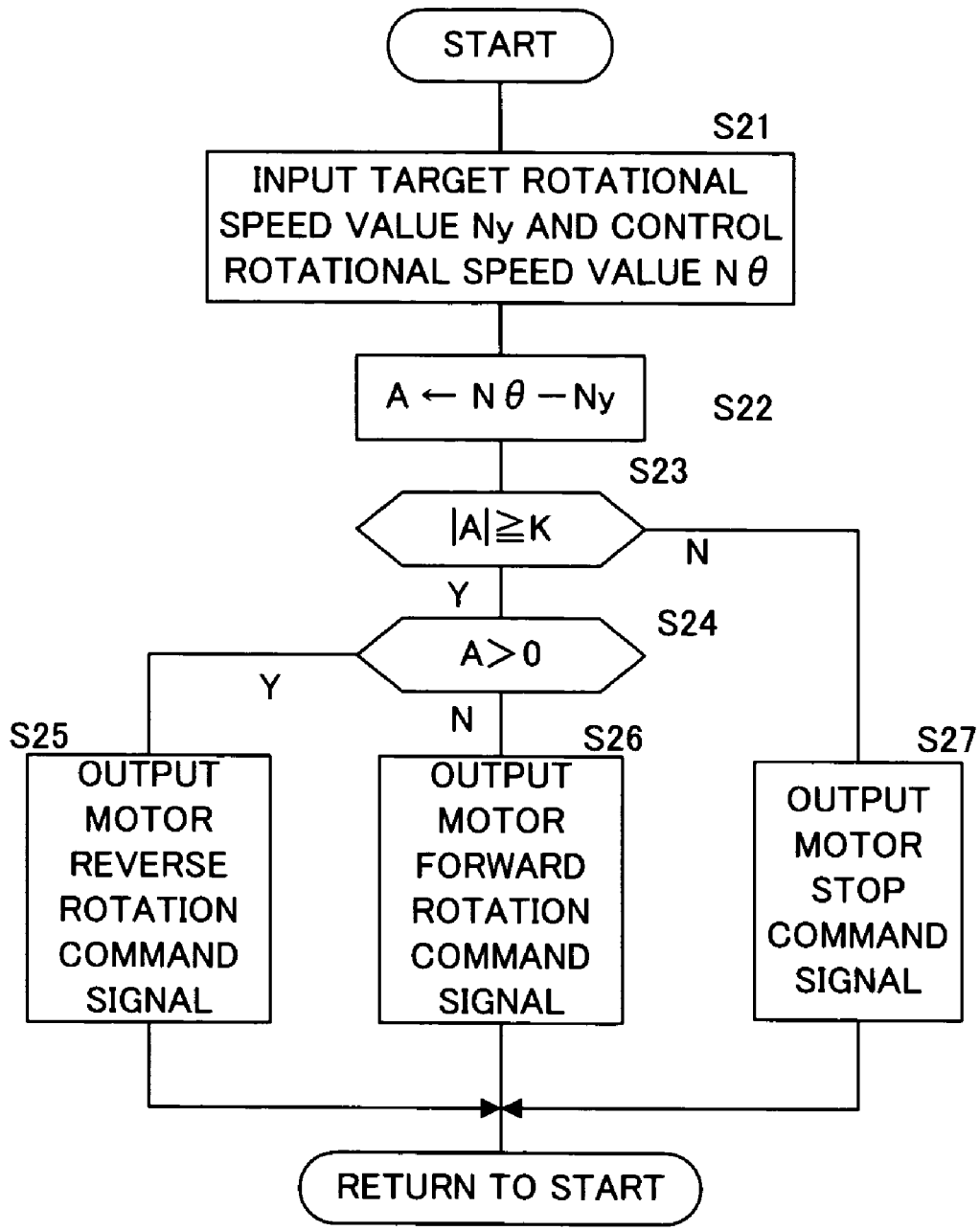
FIG. 4 is a flow chart showing an example of procedure executed by the controller.

Referring to FIG. 4, first in step S21, the rotational speed command value Ny and the control rotational speed Nθ are read in, and then the flow of control proceeds to step S22. In step S22, Ny is subtracted from Nθ and the result of this subtraction, i.e. the rotational speed differential A, is stored in a memory. In step S23, using a predetermined standard rotational speed differential K, it makes a decision as to whether or not $|A| \geqq K$. If an affirmative decision is made, the flow of control proceeds to step S24 in which a decision is made as to whether or not the rotational speed differential A>0. If A>0, it implies that the control rotational speed Nθ is greater than the rotational speed command value Ny, in other words, the control rotational speed is higher than the target rotational speed, the flow of control then proceeds to step S25 in which a signal for instructing reverse rotation of the motor is output to the pulse motor 32 in order to reduce the engine speed. As a result, the pulse motor 32 is caused to rotate in reverse so that the rotational speed of the engine 2 drops.

On the other hand, if $A \leqq 0$, it implies that the control rotational speed Nθ is lower than the rotational speed command value Ny, that is, the control rotational speed is lower than the target rotational value, a signal for instructing normal rotation of the motor is output in order to increase the engine speed, in step S26. As a result, the pulse motor 32 performs normal rotation to increase the engine speed. If a negative decision is made in step S23, the flow of control proceeds to step S27 to output a motor stop signal. Therefore, the rotational speed of the engine 2 is maintained constant. After the appropriate one of the steps S25–S27 has been executed, the flow of control returns to the beginning of this flow chart.

The outstanding features of the operation of this failure detection device for a hydraulic drive vehicle constructed as described above will now be explained in concrete term.

(1) During Normal Operation of the Traveling Motor

When the traveling motor 1 is in the normal operating condition, the leakage oil hardly flows out from the traveling motor 1 so that the oil pressure in the drain chamber 11 remains equal to or less than the predetermined value P2a. Accordingly, the switchover circuit 303 and the switchover circuit 305 of the controller 30 are switched to their contact "b" side, respectively. Due to this, the buzzer 39 and the warning lamp 40 stop their operation. In this condition, if the forward/backward switchover valve 25 is switched to forward traveling or to reverse traveling, and also the accelerator pedal 22 is stepped upon, the traveling pilot pressure P1 is generated in correspondence to the amount by which the accelerator pedal is operated. The servo control section 307 compares the target rotational speed Ny according to this traveling pilot pressure P1 with the control rotational speed Nθ corresponding to the detected value from the potentiometer 33, and then controls the pulse motor 32 to bring both rotational speeds to correspond to each other. Therefore, the engine speed increases in line with the increase of the amount of pedal operation.

(2) When Operation of the Traveling Motor Becomes Abnormal

If the motor piston 42 should get stuck at its sliding portion caused by a foreign body having gotten into the sliding portion, a large quantity of delivery oil from the hydraulic pump 3 may flow into the drain chamber 11 resulting in increase of the pressure in the drain chamber 11, as described above. And, when the drain pressure reaches the predetermined value P2a, the function generator 301 outputs the set signal to the set terminal of the flip-flop 302 so that the switchover circuit 303 is switched to its contact "a" side in response to a high level signal output from the Q terminal of the flip-flop 302. As a result, the buzzer sound is generated and the warning lamp 40 is illuminated so that an operator is able to recognize the abnormal state of the traveling motor 1. As a result, it is possible for the operator to respond appropriately to such abnormal circumstances, for instance by operating a brake.

The switchover circuit 305 is also switched to the contact "a" side according to changeover of the switchover circuit 303. Due to this, the engine speed is lowered to its idling rotational speed Ni regardless of an amount of the pedal actuation, and the motor rotational speed also drops in line with reduction in amount of the delivery oil from the pump. As a result, the quantity of oil flow into the drain chamber 11 decreases, so that it is possible to reliably prevent negative influence (secondary damage), such as the oil leakage from the drain chamber 11 into the transmission 7, that may be caused due to the abnormality of the traveling motor 1. Moreover, because the vehicle is decelerated, it is possible to stop the vehicle promptly by the brake operation. Useless consumption of fuel can be prevented as well.

In the state in which the motor drain pressure becomes equal to or below the predetermined value P2a after the traveling motor 1 has stopped, when the reset switch 36 is operated, the terminal Q of the flip-flop 302 is set to low level so that the switchover circuit 303 is switched to the contact "b" side and then the switchover circuit 305 is also switched to the contact "b" side. Due to this, the buzzer sound is stopped and also the warning lamp 40 is extinguished. In other words, the operator can intentionally stop the operation of the warning devices. Moreover, it becomes again possible to control the engine speed in accordance with operation of the accelerator pedal. As a result, when the vehicle is to be transported upon a trailer for the repair of the traveling motor 1, it is possible to load the vehicle onto the trailer by driving it under its own power. It should be understood that, instead of operating the reset switch 36, it would also be acceptable to turn off the ignition key switch 37. If the traveling motor 1 is damaged heavily and driving the vehicle under its own power is difficult or impossible, it may be pulled up on the trailer by engaging the end of a bucket of the hydraulic excavator with part of the trailer and then actuating hydraulic cylinders for a boom or arm.

According to the first embodiment as described above, when the breakdown of the traveling motor 1 is detected based upon the increase in the motor drain pressure, warning, such as buzzer sounds and illumination of the warning lamp 40 is issued. Therefore, it is possible for an operator to be made aware of abnormal operation of the traveling motor 1 at an early stage, and to respond appropriately to such abnormal circumstances. Moreover, the engine speed is lowered to the idling rotation speed Ni to restrict the drive of the traveling motor 1 when a breakdown of the motor 1 is detected. As a result, the quantity of oil flowing into the drain chamber 11 decreases, so that it becomes possible to prevent the secondary damage that may be caused by the failure of the traveling motor 1. Since the engine speed is lowered to the idling rotational speed so that the vehicle is slowed down and travels at very low speed, it is possible to pull the vehicle slowly to the shoulder of the road and to stop. Moreover, a useless waste of fuel can be prevented. In addition, the warning is kept issued and restriction upon the traveling of the vehicle is maintained until the reset switch 36 is operated or alternatively the ignition key switch 37 is turned off. Therefore, an operator is able to recognize the abnormal state of the traveling motor 1. In the state in which the drain pressure is equal to or below the predetermined value P2a, when the reset switch 36 is operated or the ignition key switch 36 is turned off alternatively, the engine speed can again be increased according to the operation of the accelerator pedal and it is possible to load the vehicle upon the trailer or the like easily.

Second Embodiment

Figure 5:
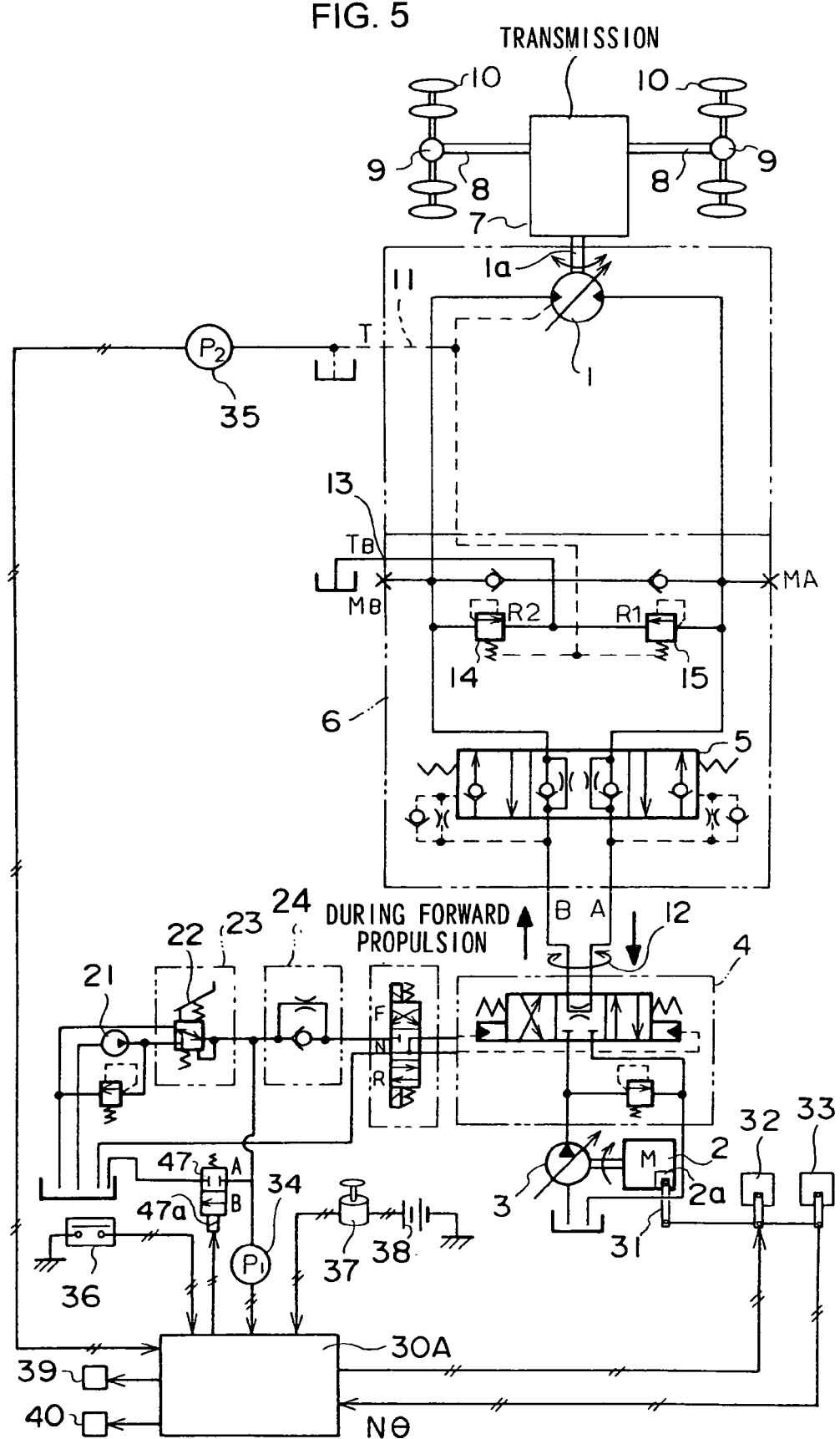
FIG. 5 is a circuit diagram showing the structure of the wheeled hydraulic excavator equipped with the failure detection device for the hydraulic motor according to the second embodiment of the present invention.
Figure 6:
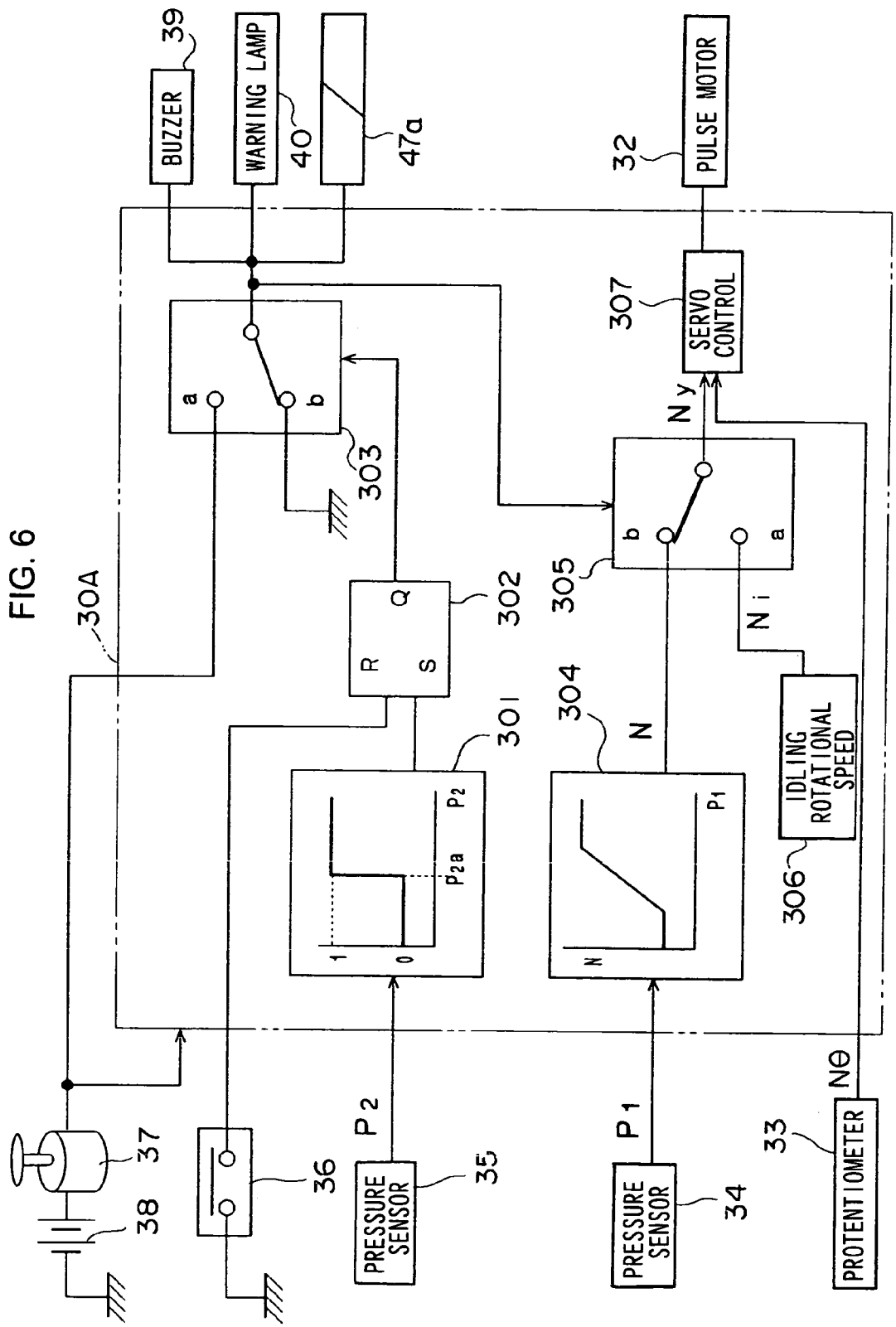
FIG. 6 schematically illustrates the details of a controller which constitutes the failure detection device according to the second embodiment of the present invention.

In the first embodiment, the engine speed is lowered to the idling rotational speed Ni to decelerate the vehicle during a failure of the traveling motor 1. The vehicle traveling will be stopped in the second embodiment. The second embodiment of the present invention will now be explained with reference to FIGS. 5 and 6. FIG. 5 is a circuit diagram showing the structure of a wheeled hydraulic excavator which is equipped with a failure detection device according to the second embodiment, and FIG. 6 schematically illustrates details of a controller 30A according to the second embodiment. It should be noted that the same reference numerals are used for elements identical to that of FIGS. 1 and 3, and the explanations will focus on the points different therefrom.

As shown in FIG. 5, the line between the traveling pilot valve 23 and the slow-return valve 24 can be connected with the reservoir through a solenoid valve 47. The solenoid valve 47 is controlled by a control signal from the controller 30A. A solenoid 47a of the solenoid valve 47 is connected with the switchover circuit 303 as shown in FIG. 6. When the pressure in the drain chamber 11 rises to the predetermined value P2a and the switchover circuit 303 is switched to the contact "a" side, the solenoid 47a is excited to switch the solenoid valve 47 to its position B. The pressure oil having acted on the pilot port of control valve 4 returns to the reservoir via the forward/backward switchover valve 25, the slow-return valve 24 and the solenoid valve 47, and the control valve 4 is driven back to its neutral position. As a result, the supply of pressure oil to the traveling motor 1 is intercepted, and the vehicle stops traveling regardless of an actuation amount of the accelerator pedal. In addition, the warning devices start their operation, and the engine speed is limited to the idling rotational speed Ni. It would also be acceptable to control the engine speed according to the value corresponding to the traveling pilot pressure instead of limiting the engine speed to the idling rotational speed Ni. In this case, the switchover circuit 305 would become unnecessary.

If the reset switch 36 is actuated while the solenoid 47a is excited, the switchover circuits 303 and 305 are switched to the contact "b" side, respectively. Accordingly, the solenoid 47a is demagnetized, and the solenoid valve 47 is switched to its position A. As a result, the traveling pilot pressure corresponding to the operation of the accelerator pedal is made to act on the pilot port of the control valve 4, and the supply of the pressure oil to the traveling motor 1 becomes possible.

According to the second embodiment as described above, when a failure of the traveling motor 1 is detected, the traveling pilot pressure is made to return to the reservoir by the operation of the solenoid valve 47. Therefore, it is possible immediately to stop the vehicle from traveling without performing brake operation and to respond appropriately to the abnormality of the traveling motor 1.

Third Embodiment

Figure 7:
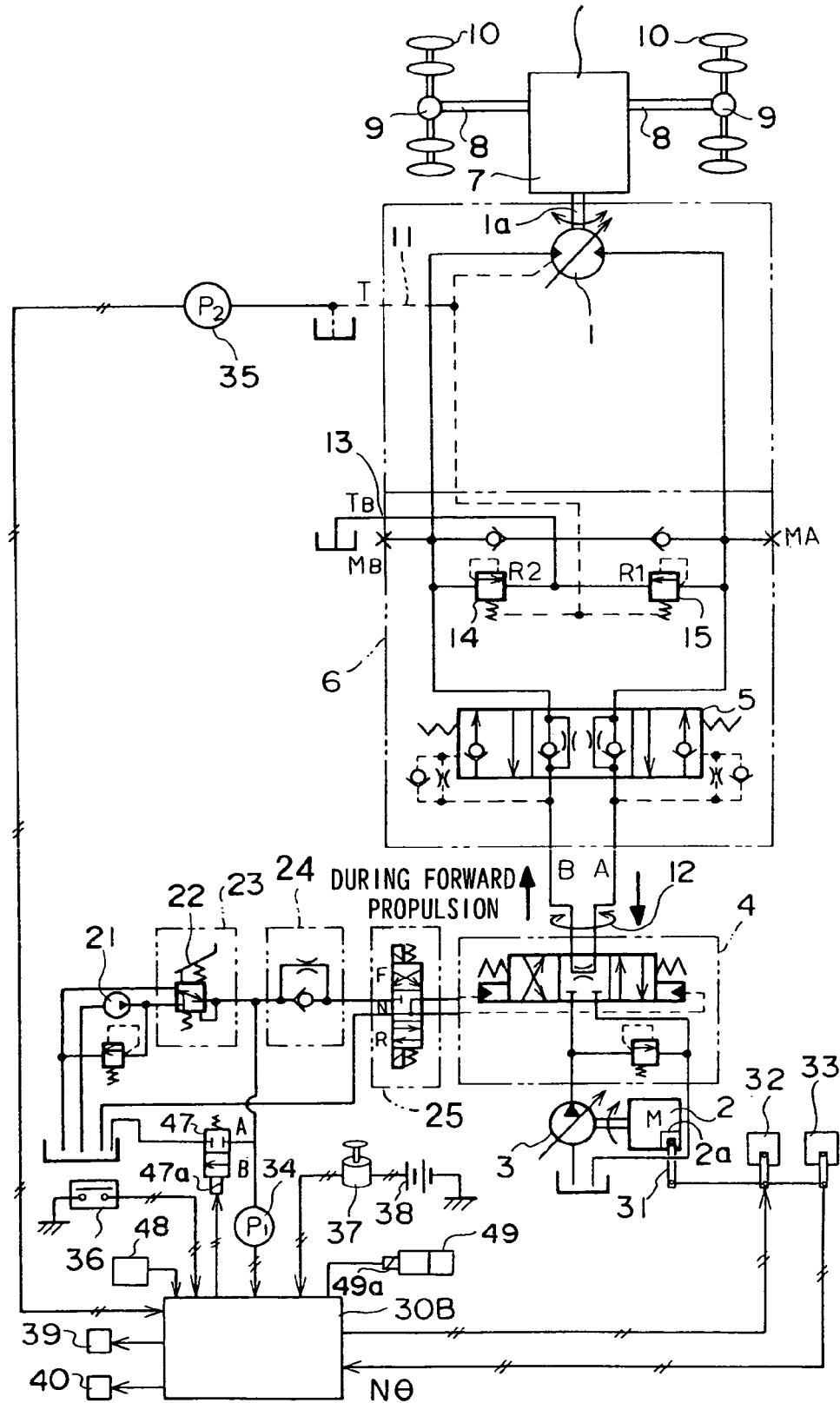
FIG. 7 is a circuit diagram showing the structure of the wheeled hydraulic excavator equipped with the failure detection device for a hydraulic motor according to the third embodiment of the present invention.
Figure 8:
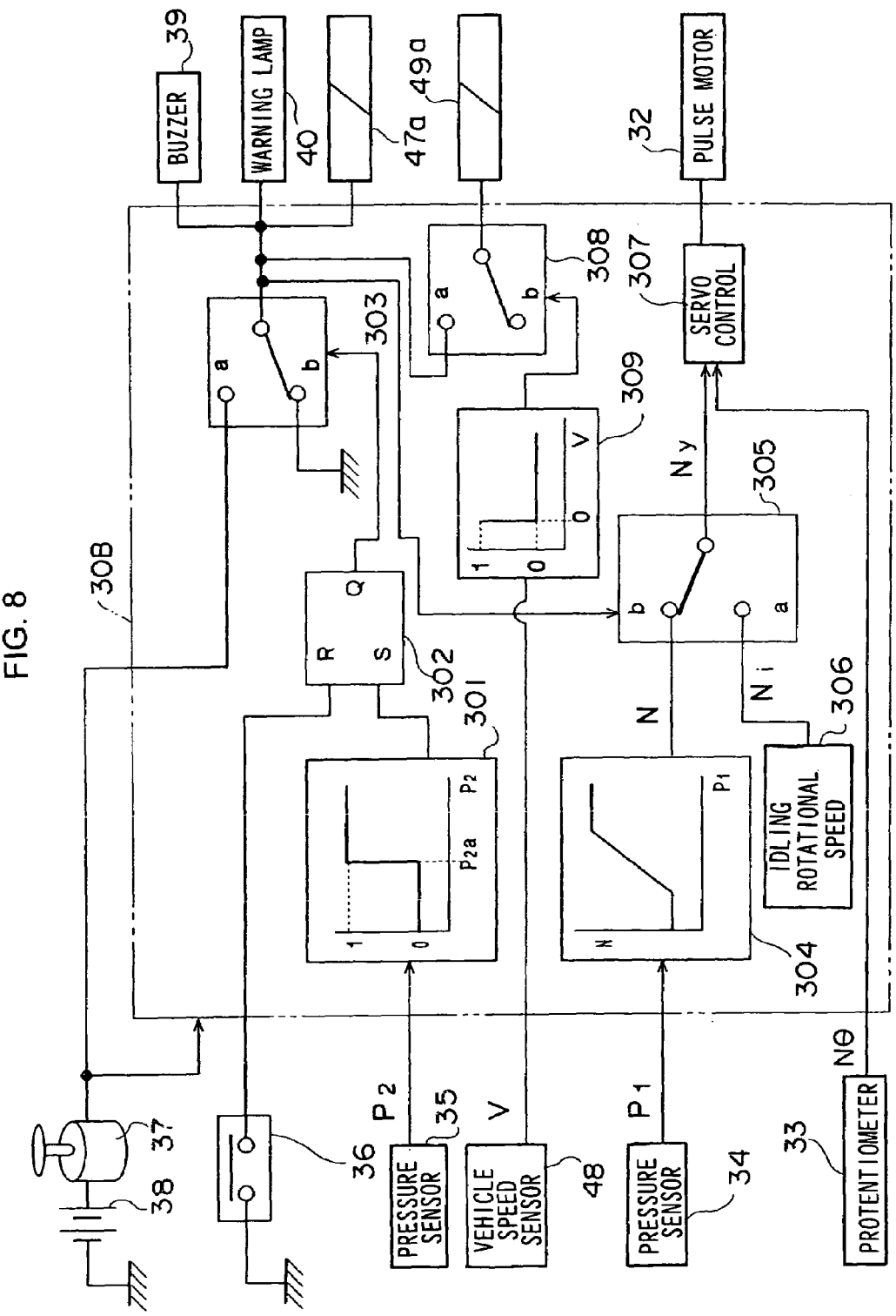
FIG. 8 schematically illustrates the details of the controller which constitutes the failure detection device according to the third embodiment of the present invention.

In the second embodiment, the vehicle traveling is stopped during a failure in the traveling motor 1. A brake (a parking brake) is additionally applied to the vehicle in the third embodiment. The third embodiment of the present invention will now be explained with reference to FIGS. 7 and 8. FIG. 7 is a circuit diagram showing the construction of a wheeled hydraulic excavator which is equipped with a failure detection device according to the third embodiment, and FIG. 8 schematically illustrates the structure of a controller 30B according to the third embodiment. It should be noted that the same reference numerals are used for elements identical to that of FIGS. 5 and 6, and the explanation will focus on the points different therefrom.

As shown in FIG. 7, a vehicle speed sensor 48 that detects a traveling speed of the vehicle and a solenoid valve 49 for operating the parking brake are additionally provided. It should be noted that the parking brake is of type that is well-known and is operated according to open/close operation of the solenoid valve 49, and a drawing of which is omitted herein. As shown in FIG. 8, a solenoid 49a of the solenoid valve 49 is connected with the switchover circuit 303 via a switchover circuit 308. A function generator 309 switches the switchover circuit 308 according to a detection value V from the vehicle speed sensor 48.

When the vehicle traveling, the function generator 309 switches the switchover circuit 308 to the contact "b" side as shown in the figure. As a result, the solenoid 49a is demagnetized to release the parking brake. When the switchover circuit 303 is switched to the contact "a" side due to a failure of the traveling motor 1, the solenoid 47a of the solenoid valve 47 is excited to stop the vehicle as described above. After that, when it is detected by the vehicle speed sensor 48 that the vehicle has stopped, in other words the vehicle speed becomes zero, the function generator 309 switches the switchover circuit 308 to the contact "a" side. As a result, the solenoid 49a is excited to engage the parking brake in operation. When the switchover circuit 303 is switched to the contact "b" side according to the reset switch turned on, the solenoid 49a is demagnetized and accordingly the parking brake is released. It should be noted that the engine speed may be or may not be restricted to the idling rotational speed in the case of a failure of the traveling motor 1 in the third embodiment. Moreover, a timer may be connected with the function generator 309 to detect that the state in which the vehicle speed is zero is maintained for a predetermined time period. In this case, the switchover circuit 308 is switched to the contact "a" side when the predetermined time period has elapsed after the vehicle speed becomes zero.

According to the third embodiment, when stopping of the traveling motor 1 due to a failure of the traveling motor 1 is detected, the parking brake is additionally applied. In this manner, it would be possible to ensure the stationary state of the vehicle even when it is on the slope.

Fourth Embodiment

Figure 9:
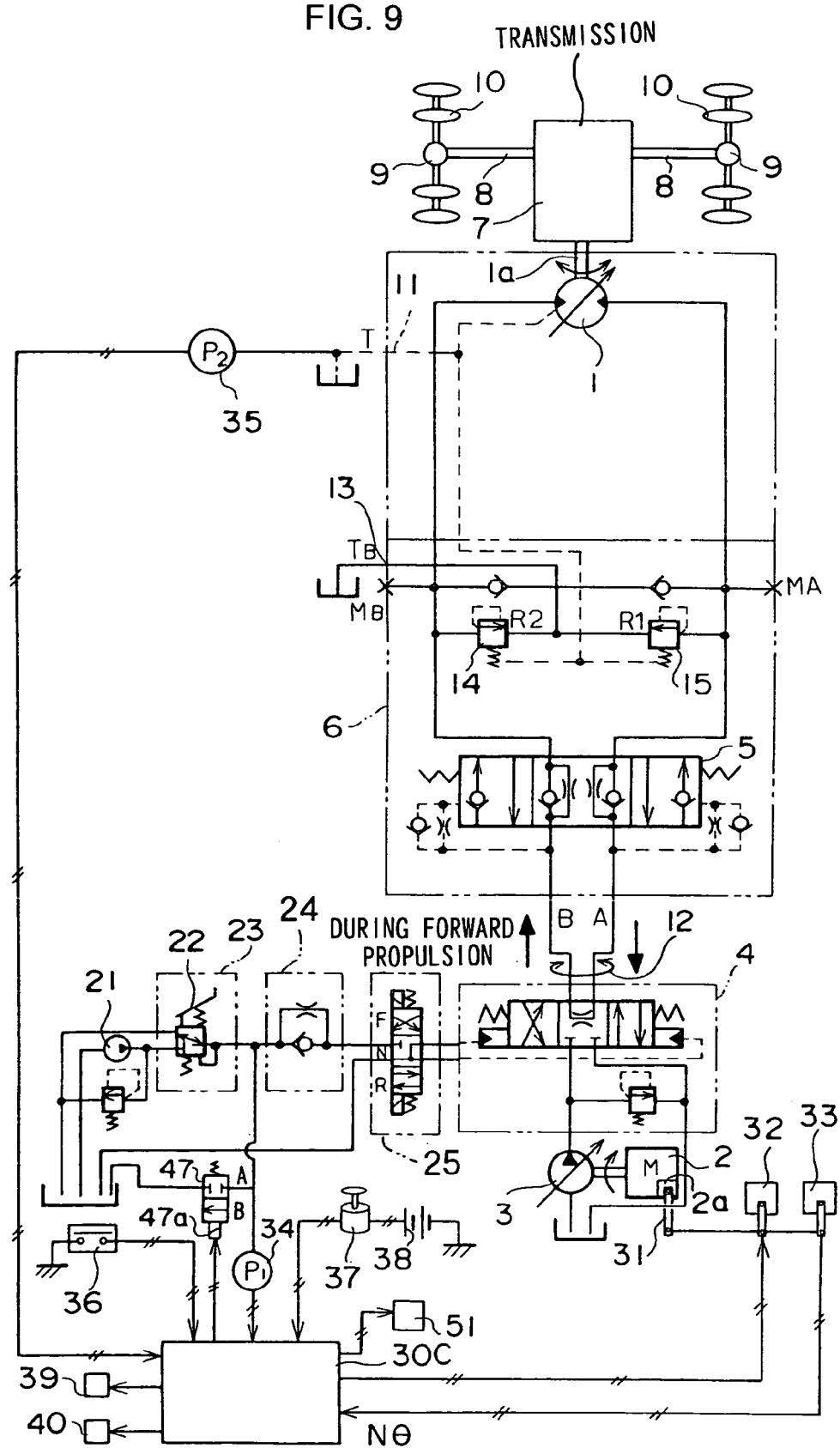
FIG. 9 is a circuit diagram showing the structure of the wheeled hydraulic excavator equipped with the failure detection device for a hydraulic motor according to the fourth embodiment of the present invention.
Figure 10:
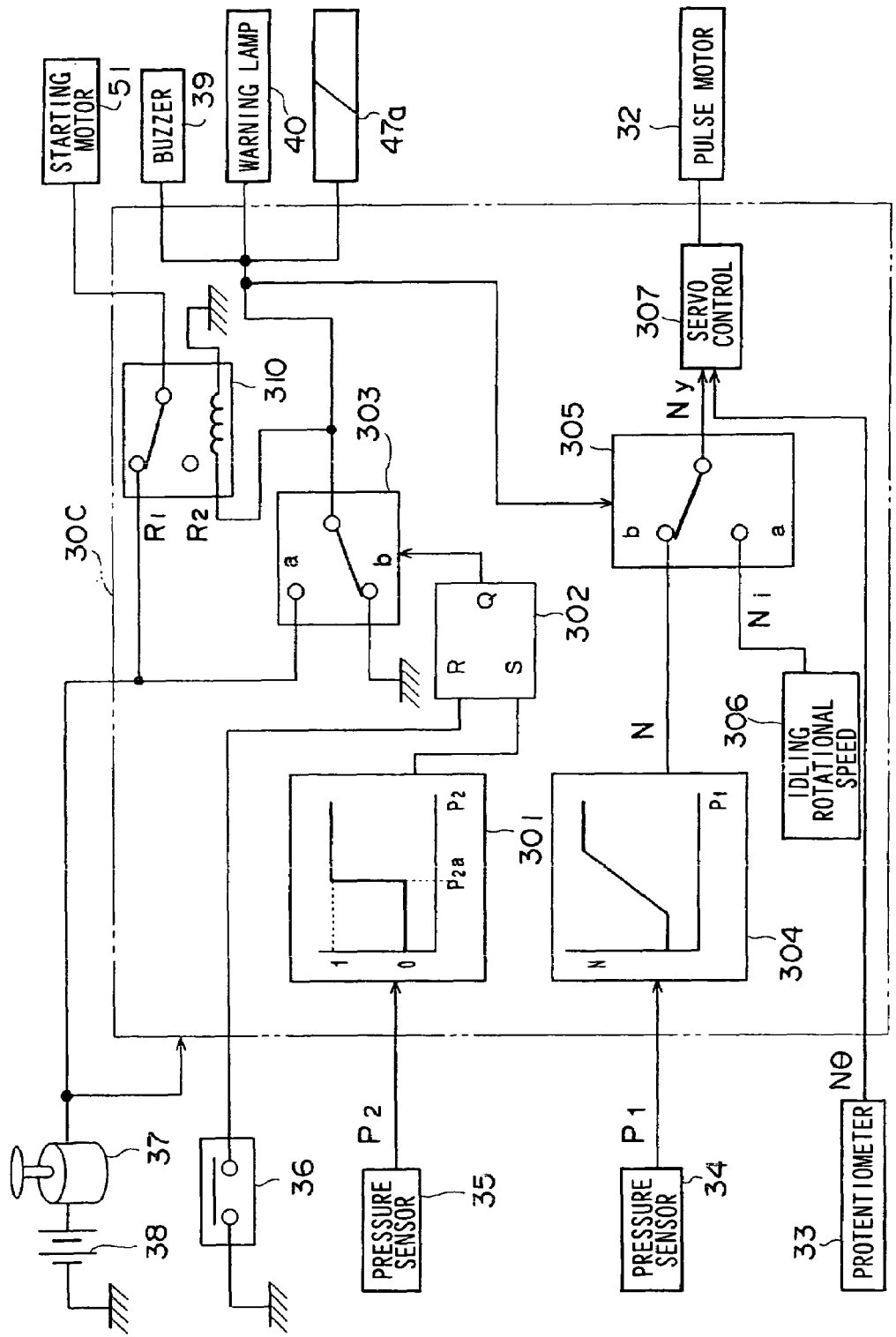
FIG. 10 schematically illustrates the details of the controller which constitutes the failure detection device according to the fourth embodiment of the present invention.

In the second embodiment, the vehicle traveling is stopped during a failure of the motor. In addition to this function, the engine 2 is prohibited from restarting in the fourth embodiment. The fourth embodiment of the present invention will now be explained with reference to FIGS. 9 and 10. FIG. 9 is a circuit diagram showing the structure of a wheeled hydraulic excavator equipped with a failure detection device according to the fourth embodiment, and FIG. 10 schematically illustrates details of a controller 30C according to the fourth embodiment. It should be noted that the same reference numerals are used for elements identical to that of FIGS. 5 and 6, and the explanation will focus on the points different therefrom.

As shown in FIG. 9, a starting motor 51 is connected with the controller 30C, and the drive of the starting motor 51 is controlled thereby. As shown in FIG. 10, the ignition key switch 37 is connected with the starting motor 51 via a relay 310, and the output terminal of the switchover circuit 303 is connected with the coil of the relay 310. By this structure, when the switchover circuit 303 is switched to the contact "a" side according to a failure of the traveling motor 1, the solenoid 47a is excited to stop the vehicle traveling. And the coil of the relay 310 is supplied with actuating electrical energy so that the relay contact is switched to its contact "R2" side. As a result, the supply of electricity to the starting motor 51 is cut, and it is impossible to start the engine 2 even if the ignition key switch 37 is turned on.

When, in such a state, the reset switch 36 is actuated, the switchover circuit 303 is switched to the contact "b" side, and the supply of electricity to the coil of the relay 310 is intercepted. The relay contact is thus switched to the contact "R1" side, which makes possible to restart the engine 2. It should be noted that it would also be possible to restart the engine 2, as an alternative to operation of the reset switch 36, by a repairman, etc. using some apparatuses to supply an external signal of some type. In this manner, it would not be possible for an operator to restart the engine upon his own decision. While, in the fourth embodiment, the vehicle is made to stop traveling during a failure of the traveling motor 1, it is also acceptable to limit the engine speed or to apply the parking brake as alternatives.

According to the fourth embodiment as described above, the engine is prohibited from restarting when a failure of the traveling motor 1 is detected. Therefore, an operator will not imprudently restart the engine 2 to drive the vehicle, and it is possible to ensure that he makes an appropriate response to the abnormal operation of the traveling motor 1.

Fifth Embodiment

Figure 11:
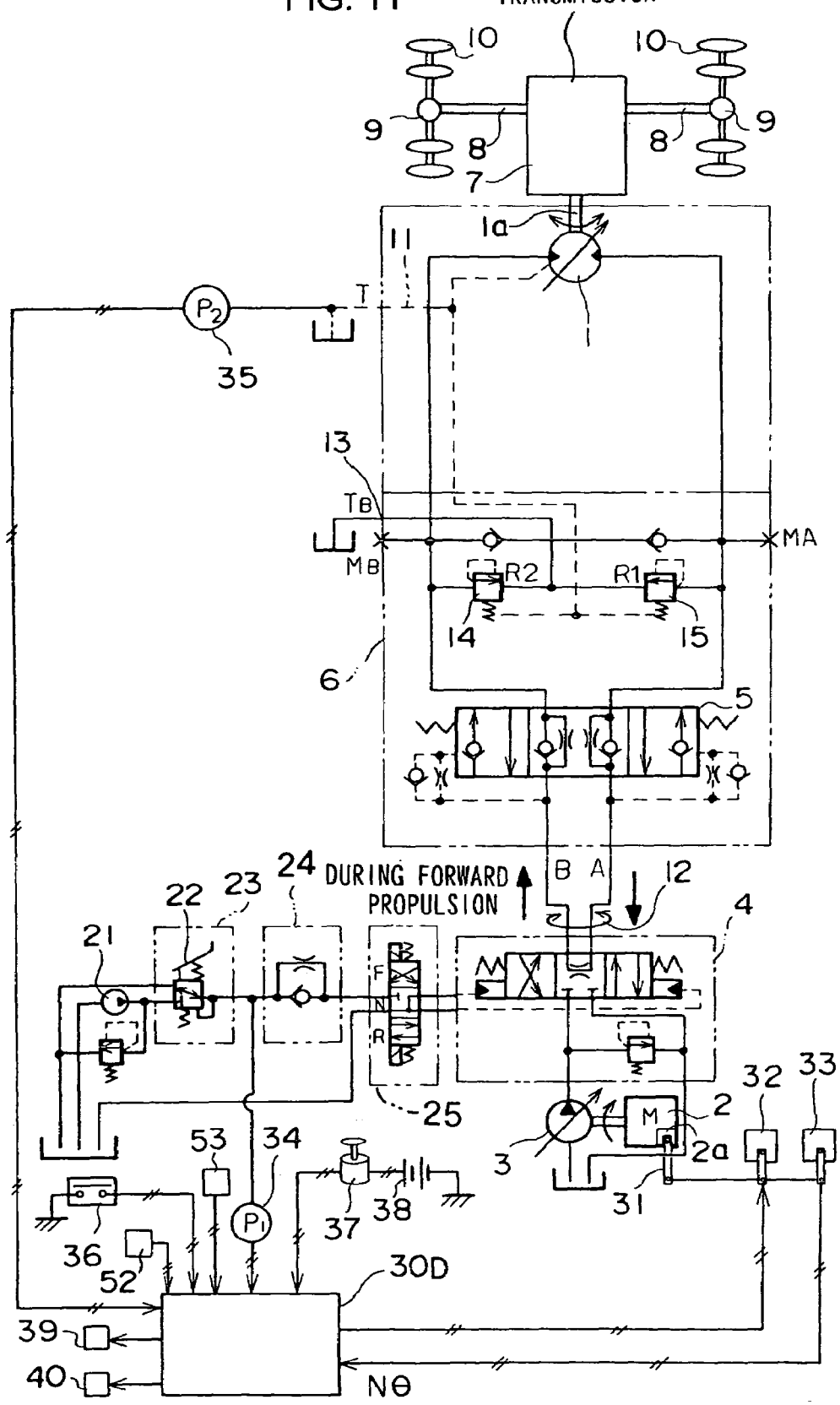
FIG. 11 is a circuit diagram showing the structure of the wheeled hydraulic excavator equipped with the failure detection device for a hydraulic motor according to the fifth embodiment of the present invention.
Figure 12:
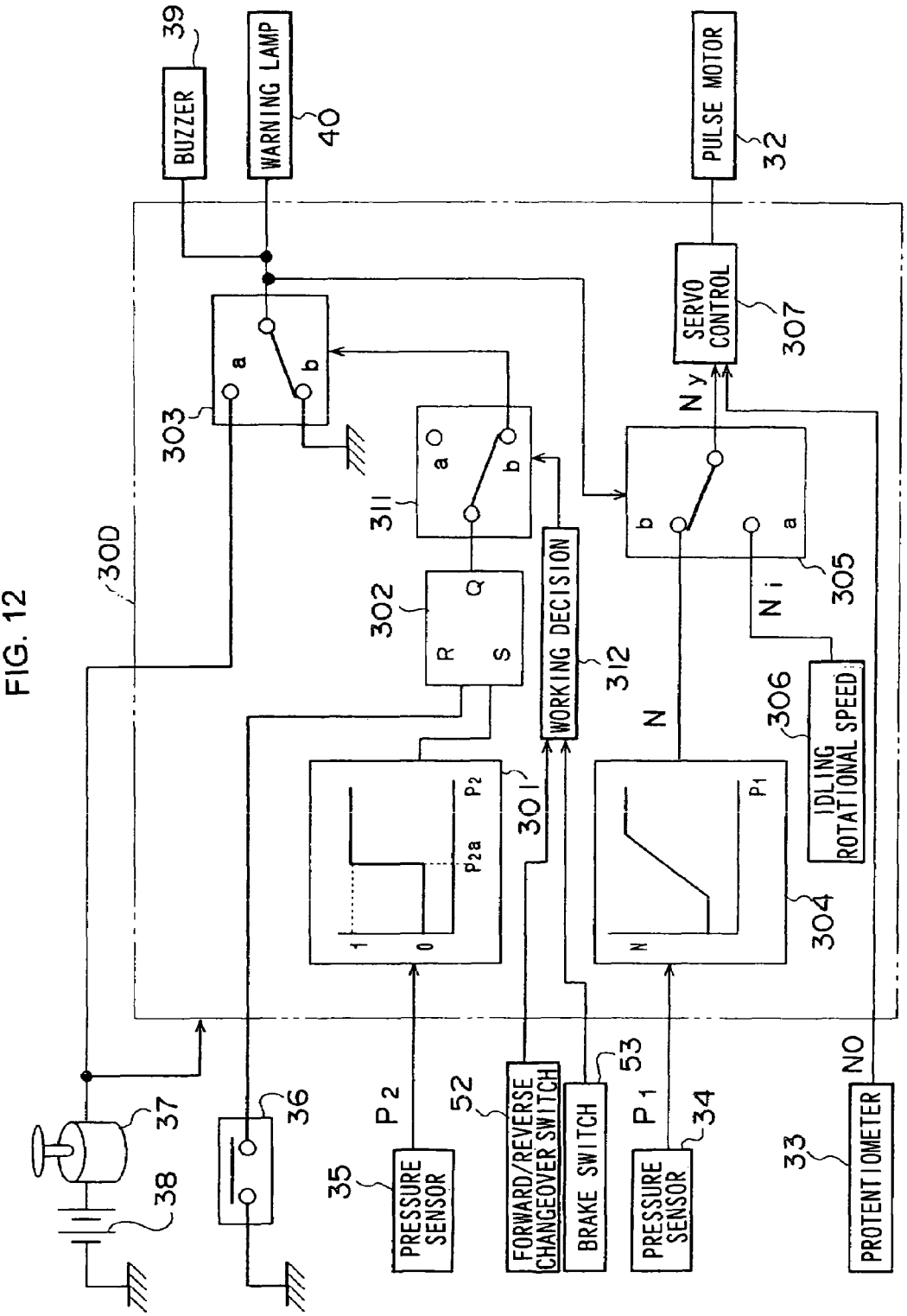
FIG. 12 schematically illustrates the details of the controller which constitutes the failure detection device according to the fifth embodiment of the present invention.
Figure 13:
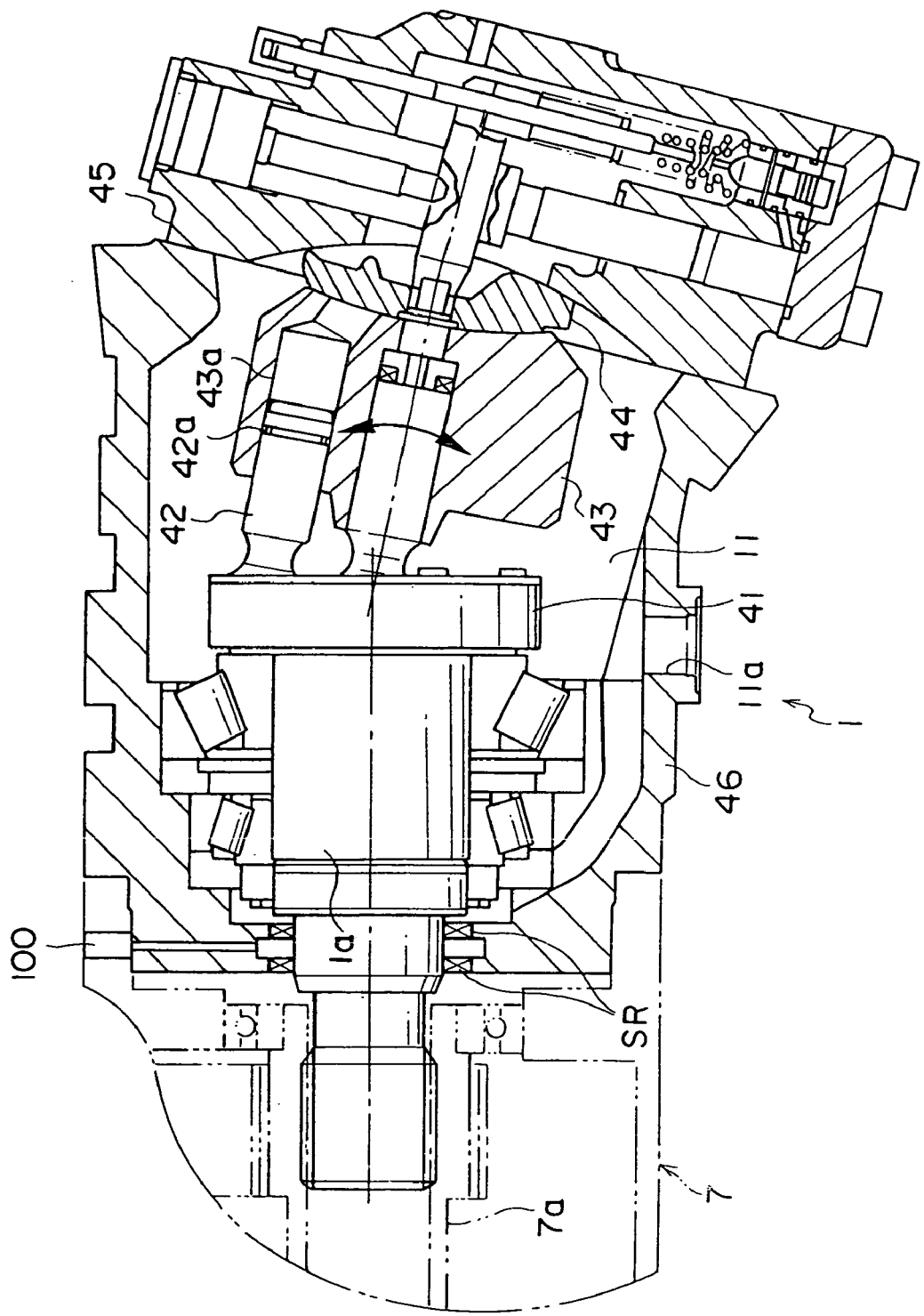
FIG. 13 shows a modification example of the failure detection device according to the present invention.

In the first embodiment, the engine speed is limited to the idling rotational speed when a failure of the traveling motor 1 is detected, regardless of the traveling state or the working state. In the fifth embodiment, the engine speed is limited only during the traveling state. The fifth embodiment of the present invention will now be explained with reference to FIGS. 11 and 12. FIG. 11 is a circuit diagram showing the structure of a wheeled hydraulic excavator equipped with a failure detection device according to the fifth embodiment, and FIG. 12 schematically illustrates details of a controller 30D according to the fifth embodiment. It should be noted that the same reference numerals are used for elements identical to that of FIGS. 1 and 3, and the explanations will focus on the points different therefrom.

As shown in FIG. 11, a forward/reverse changing switch 52 for outputting a switching command to the forward/reverse switchover valve 25, and a brake switch 53 for outputting an operate command to a work brake not shown in the figures are also connected to the controller 30D. As shown in FIG. 12, a switchover circuit 311 is connected with the terminal Q of the flip-flop 302, and the switchover circuit 311 is switched according to a signal from a work detection section 312. Signals from the forward/reverse changing switch 52 and the brake switch 53 are inputted to the work detection section 312. The work detection section 312 sets the switchover circuit 311 to the contact "a" side when the forward/reverse switchover valve 25 is in the neutral position and also the work brake is being operated, while in other conditions, the switchover circuit 311 is switched to the contact "b" side.

Accordingly, the switchover circuit 311 is switched to the contact "b" side during the vehicle traveling. And in this condition if a failure of the traveling motor 1 occurs the switchover circuits 303 and 305 are switched to the contact "a" side to restrict the engine speed to the idling rotational speed Ni. When, in such a condition, the forward/reverse switchover valve 25 is set to the neutral position in response to the operation of the forward/reverse changing switch 52, and also the work brake is operated by the operation of the brake switch 53, the switchover circuit 311 is then switched to the contact "a" side. In response to such changeover, the switchover circuits 303 and 305 are both switched to the contact "b" side to cancel the restriction of the engine speed. As a result, it is possible to again increase the engine speed according to the pedal actuation and to continue working in the normal manner. In this condition, if the forward/backward switchover valve 25 is switched to forward traveling or to reverse traveling, intending to travel the vehicle, the switchover circuits 303 and 305 are both switched to the contact "a" side. As a result, the engine speed is made to decrease to the idling rotational speed Ni again.

According to the fifth embodiment, it is decided as to whether or not the work operation has started according to actuations of the forward/reverse changing switch 52 and the brake switch 53, and the restriction of the engine speed is disabled during the work operation. Therefore, it is possible to continue working in the normal manner even when the traveling motor 1 has broken down. It should be noted that the fifth embodiment can be applied, not only to a system which restricts the engine speed during a failure of the traveling motor 1, but also, in the same manner, to systems which controls the vehicle traveling in other ways, such as by stopping the vehicle traveling, by preventing the engine from restarting, or by causing the parking brake to operate.

While the pressure rise in the drain chamber 11 is detected by the pressure sensor 35 to detect the failure of the traveling motor 1 as described above, the failure of the traveling motor 1 may be detected in other ways. By way of example, a sensor (a pressure sensor) 100 for detecting oil leakage from the drain chamber 11 into the transmission 7 may be provided at a portion of seal section of the motor output shaft 1a. And, it may be determined that the traveling motor 1 has broken down when the sensor 100 detects the oil leakage caused by damages upon the seal rings SR. It is also acceptable to detect oil level in the transmission 7 instead of using the sensor 100. In this case, the failure of the traveling motor 1 may be determined when the oil level in the transmission 7 is increased by oil flowing from the drain chamber 11. In addition, a sensor (G sensor or the like) for the impact detection may be installed, for example at a bearing that holds the motor output shaft 1a, and when this sensor detects the impact load which is greater than or equal to a predetermined value, it shall be detected that the traveling motor 1 has broken down.

Moreover, although in the above described embodiments, the buzzer sound is emitted along with the illumination of the warning lamp 40 when the traveling motor 1 has broken down, it would also be acceptable to provide one of the warning devices. Furthermore, it would be possible to flash the hazard warning lamps which are provided around the vehicle, in order to arouse the attention around the vehicle. Although, upon a failure of the traveling motor 1, the provision of warning and the restriction of the vehicle traveling have been performed at the same time, it would be also acceptable to perform only one of them. Moreover, although the driving of the traveling motor 1 is limited during a failure of the traveling motor 1, driving of other actuators, such as a swing motor, may as well be restricted. Finally, in the above described embodiments, the abnormality of the traveling motor 1 is detected using the pressure sensor 35 or the like, the abnormal state of other hydraulic motors may be detected.

INDUSTRIAL APPLICABILITY

While a failure detection device for a hydraulic motor has been explained in terms of application to a wheeled hydraulic excavator by way of example, it would also be possible, in the same manner, to apply the failure detection device of the hydraulic motor according to the present invention to a crawler hydraulic excavator, or to other kinds of hydraulic drive vehicles.

What is claimed is:

1. A failure detection device for a hydraulic motor, comprising:
    a hydraulic pump that is driven by a prime mover;
    a hydraulic motor that is driven by hydraulic oil discharged from the hydraulic pump;
    an abnormality detection device that detects an abnormal operation of the hydraulic motor; and
    a drive restriction device that restricts a driving of the hydraulic motor when the abnormal operation of the hydraulic motor is detected by the abnormality detection device, wherein
    the abnormality detection device detects the abnormal operation of the hydraulic motor based upon a drain pressure of the hydraulic motor.

2. A failure detection device for a hydraulic motor, comprising:
    a hydraulic pump that is driven by a prime mover;
    a hydraulic motor that is driven by hydraulic oil discharged from the hydraulic pump;
    an abnormality detection device that detects an abnormal operation of the hydraulic motor;
    a warning device that issues a warning when the abnormal operation of the hydraulic motor is detected by the abnormality detection device; and a seal member that prevents a drain oil of the hydraulic motor from flowing out of the hydraulic motor, wherein the abnormality detection device detects the drain oil which flows out due to a damage upon the seal member.

3. A failure detection device for a hydraulic motor, comprising:

a hydraulic pump that is driven by a prime mover;

a hydraulic motor that is driven by hydraulic oil discharged from the hydraulic pump;

an abnormality detection device that detects an abnormal operation of the hydraulic motor;

a drive restriction device that restricts a driving of the hydraulic motor when the abnormal operation of the hydraulic motor is detected by the abnormality detection device; and a seal member that prevents a drain oil of the hydraulic motor from flowing out of the hydraulic motor, wherein the abnormality detection device detects the drain oil which flows out due to a damage upon the seal member.

4. A failure detection device for a hydraulic motor, comprising:

a hydraulic pump that is driven by a prime mover;

a hydraulic motor that is driven by hydraulic oil discharged from the hydraulic pump;

an abnormality detection device that detects an abnormal operation of the hydraulic motor;

a warning device that issues a warning when the abnormal operation of the hydraulic motor is detected by the abnormality detection device;

a working detection device that detects a working state; and a warning control device that disables the warning device from issuing the warning when the working detection device detects the working state.

5. A failure detection device for a hydraulic motor, comprising:

a hydraulic pump that is driven by a prime mover;

a hydraulic motor that is driven by hydraulic oil discharged from the hydraulic pump;

an abnormality detection device that detects an abnormal operation of the hydraulic motor;

a drive restriction device that restricts a driving of the hydraulic motor when the abnormal operation of the hydraulic motor is detected by the abnormality detection device;

a working detection device that detects a working state; and a drive restriction control device that disables a drive restriction on the hydraulic motor by the drive restriction device when the working detection device detects the working state.

6. A failure detection device for a hydraulic motor, comprising:

a hydraulic pump that is driven by a prime mover;

a hydraulic motor that is driven by hydraulic oil discharged from the hydraulic pump;

an abnormality detection device that detects an abnormal operation of the hydraulic motor;

a warning device that issues a warning when the abnormal operation of the hydraulic motor is detected by the abnormality detection device; and a reset command switch that resets the warning device.

7. A failure detection device for a hydraulic motor, comprising:

a hydraulic pump that is driven by a prime mover;

a hydraulic motor that is driven by hydraulic oil discharged from the hydraulic pump;

an abnormality detection device that detects an abnormal operation of the hydraulic motor;

a drive restriction device that restricts a driving of the hydraulic motor when the abnormal operation of the hydraulic motor is detected by the abnormality detection device; and a reset command switch that resets the drive restriction device.

8. A failure detection device for a hydraulic motor, comprising:

a hydraulic pump that is driven by a prime mover;

a hydraulic motor that is driven by hydraulic oil discharged from the hydraulic pump;

an abnormality detection device that detects an abnormal operation of the hydraulic motor; and a warning device that issues a warning when the abnormal operation of the hydraulic motor is detected by the abnormality detection device, wherein the warning device is reset by actuation of an ignition key switch.

* * * * *